United States Patent
Gupta et al.

(10) Patent No.: US 7,617,416 B2
(45) Date of Patent: Nov. 10, 2009

(54) SYSTEM, METHOD, AND APPARATUS FOR FIRMWARE CODE-COVERAGE IN COMPLEX SYSTEM ON CHIP

(75) Inventors: Shiv Kumar Gupta, Bangalore (IN); Ravi Ilpakurty, Bangalore (IN); K. S. Narendranath, Hyderabad (IN)

(73) Assignee: Broadcom Corporation, Irvine, CA (US)

( * ) Notice: Subject to any disclaimer, the term of this patent is extended or adjusted under 35 U.S.C. 154(b) by 496 days.

(21) Appl. No.: 10/765,615

(22) Filed: Jan. 27, 2004

(65) Prior Publication Data
US 2005/0166103 A1    Jul. 28, 2005

(51) Int. Cl.
*G06F 11/00* (2006.01)
(52) U.S. Cl. .................... 714/33; 714/30; 714/37; 714/38; 714/47
(58) Field of Classification Search ............ 714/30, 714/33, 37, 38, 39, 45, 47, 51
See application file for complete search history.

(56) References Cited

U.S. PATENT DOCUMENTS

| | | | | |
|---|---|---|---|---|
| 5,968,188 | A * | 10/1999 | Rana | 714/45 |
| 6,708,143 | B1 * | 3/2004 | Kurshan | 714/33 |
| 2001/0013119 | A1 * | 8/2001 | Agarwal | 717/11 |
| 2005/0193254 | A1 * | 9/2005 | Yee | 714/30 |

* cited by examiner

*Primary Examiner*—Robert Beausoliel
*Assistant Examiner*—Joseph D Manoskey
(74) *Attorney, Agent, or Firm*—McAndrews Held & Malloy, Ltd.

(57) ABSTRACT

Presented herein is a system, method, and apparatus for firmware code-coverage in complex system on chip. A circuit for analyzing code coverage of firmware by test inputs comprises an input and a memory. The input receives an address from a code address bus. The memory stores recorded addresses from the code address bus. The memory comprises a plurality of memory locations, each of the memory locations mapped to a particular one of a corresponding plurality of addresses associated with the firmware. The contents of the memory location associated with the address received from the code address bus being incremented responsive to receipt of the address.

13 Claims, 3 Drawing Sheets

SYSTEM, METHOD, AND APPARATUS FOR FIRMWARE CODE-COVERAGE IN COMPLEX SYSTEM ON CHIP

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One of the most difficult and time-consuming steps in the design of any system on chip (SOC) verification is firmware code coverage. The more complex the chip, the more difficult and time consuming the code-coverage task. Further adding to this, if the firmware is "embedded" within the SOC, then code coverage becomes even more complex and complicated.

Code coverage analysis includes finding areas of a program not exercised by a set of test cases, creating additional test cases to increase coverage, and determining a quantitative measure of code coverage, which is an indirect measure of quality. An optional aspect of code coverage analysis is identifying redundant test cases that do not increase coverage. Coverage analysis is critical and important for complex system-on-chip verification and assures quality of set tests.

Embedded code-coverage has been done in simulations. As designs get bigger and users integrate more large blocks together to create huge SOCs, simulation time becomes unbearably long. Simulations can sometimes take in the order of several weeks. Some existing coverage analysis techniques access test program source code and often recompile it with a special command. This requires additional memory within the chip as the test cases are compiled along with "actual" firmware. This requires also more memory for this "virtual" code and drives up the cost of the SOC.

Further limitations and disadvantages of conventional and traditional approaches will become apparent to one of skill in the art, through comparison of such systems with embodiments presented in the remainder of the present application with references to the drawings.

BRIEF SUMMARY OF THE INVENTION

Presented herein is a system, method, and apparatus for firmware code-coverage in a complex system on chip.

In one embodiment, there is presented a circuit for analyzing code coverage of firmware by test inputs. The circuit comprises an input and a memory. The input receives an address from a code address bus. The memory stores recorded addresses from the code address bus. The memory comprises a plurality of memory locations, where each of the memory locations mapped to a particular one of a corresponding plurality of addresses associated with the firmware. The contents of the memory location associated with the address received from the code address bus are incremented responsive to receipt of the address.

In another embodiment, there is presented a method for analyzing code coverage. The method comprises receiving an address from a code address bus, the address being associated with an instruction in a system on chip; and incrementing a memory location mapped to the address associated with the instruction.

In another embodiment, there is presented a circuit for analyzing code coverage of firmware by test inputs. The circuit comprises an input, and a memory. The input receives an address from a code address bus. The memory is operably connected to the input, and stores recorded addresses from the code address bus. The memory comprises a plurality of memory locations, each of the memory locations mapped to a particular one of a corresponding plurality of addresses associated with the firmware. The contents of the memory location associated with the address received from the code address bus are incremented responsive to receipt of the address.

These and other advantages and novel features of the present invention, as well as details of an illustrated embodiment thereof, will be more fully understood from the following description and drawings.

DETAILED DESCRIPTION OF THE INVENTION

Figure 1:
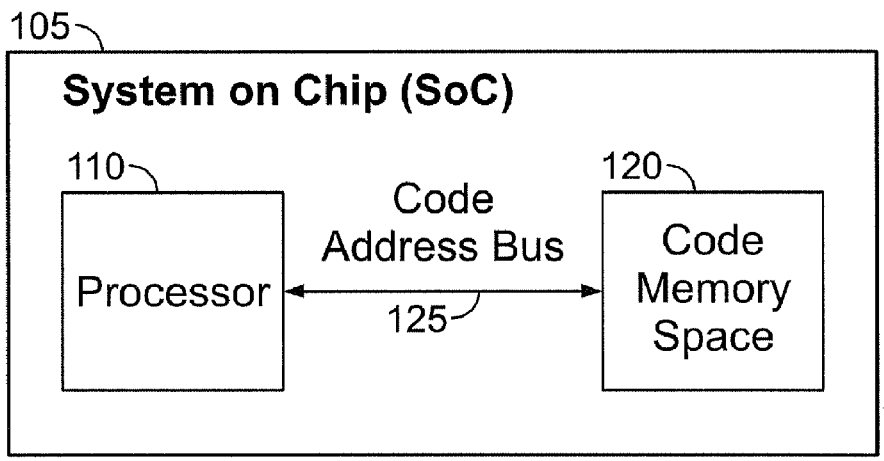
FIG. 1 is a block diagram of an exemplary system on chip whereon the present invention can be practiced.

Referring now to FIG. 1, there is illustrated a block diagram describing the testing of a system on chip in accordance with an embodiment of the present invention. The testing can either be post-fabrication or pre-fabrication. In the post-fabrication case, the system on chip (SOC) 105 can include any one of a variety of integrated circuits comprising an embedded processor 110 that executes instructions. The instructions are collectively referred to as firmware. In the pre-fabrication case, the system on chip 105 can be implemented or comprise an emulator or portion thereof, configured to emulate a design representative of any one of a variety of integrated circuits comprising an embedded processor 110.

The SOC 105 also comprises code memory space 115 for storing the firmware. When the processor executes the instructions from the firmware, the address of the instruction is provided to a code address bus 120. The code address bus 120 provides the address to the code memory space 115. Responsive thereto, the code memory space 115 provides the instruction stored at the address to the processor 110.

During testing, the SOC 105 is provided with test inputs. The operation of the SOC 105 for the test inputs can be evaluated to determine whether the SOC 105 operates properly, by evaluating the outputs. However, the test inputs do not always cause execution of each instruction in the firmware. Where the test inputs do not cause execution of each instruction in the firmware, it is possible that the firmware includes an erroneous instruction that did not affect the outputs, because the inputs did not cause execution of the erroneous instruction. Accordingly, it is beneficial to provide test inputs that achieve high code coverage.

Figure 2:
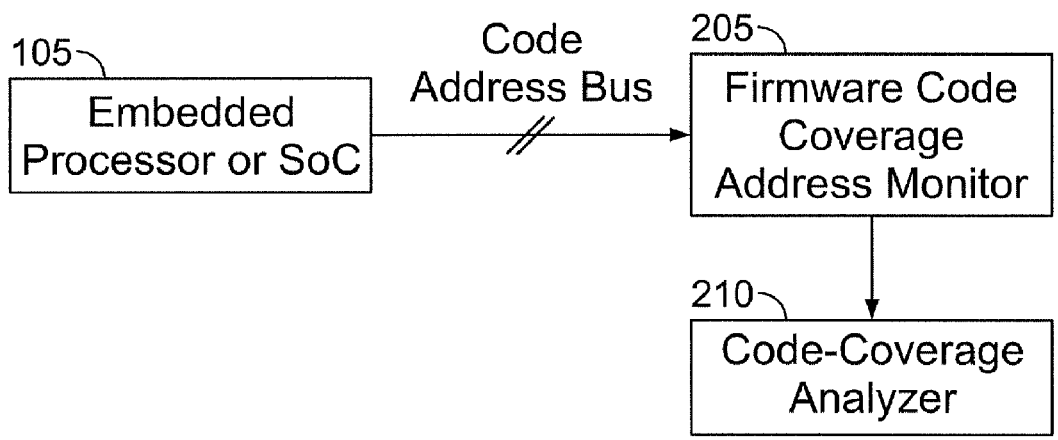
FIG. 2 is a block diagram describing the testing of a system on chip in accordance with an embodiment of the present invention.

Referring now to FIG. 2, there is illustrated a block diagram describing the testing of an SOC in accordance with an embodiment of the present invention. The code address bus 120 is connected to a code coverage address monitor module 205. The addresses from the SOC 105 represent the firmware code that is being fetched from the code memory space 115.

The code coverage address monitor 205 is a standalone module that is interfaced with the code address bus 120. The code coverage address monitor 205 captures the addresses from the code address bus 120 to be used for code coverage analysis. In one embodiment, the code coverage address monitor can be implemented as an appropriately configured emulator, or portion thereof.

A code coverage analyzer 210 analyzes the captured data. The code coverage analyzer 210 can comprise a computer system execution software that runs algorithms to determine the code coverage. Code coverage measures the degree that each instruction in the firmware is executed by the test inputs. Code coverage includes statement coverage, decision coverage, condition coverage, multiple condition coverage, condition/decision coverage, path coverage, function coverage, call coverage, data flow coverage, and object code branch coverage.

Statement coverage reports whether each executable statement is encountered. Statement coverage is also known as "line coverage", "segment coverage", and "basic block coverage". Basic block coverage is similar to statement coverage except the unit of code measured is each sequence of non-branching statements.

Decision coverage reports whether Boolean expressions tested in control structures are evaluated to both true and false. Condition coverage reports the true or false outcome of each Boolean sub-expression, separated by logic-and and logical-or, if they occur. Condition coverage measures the sub-expressions independently of each other.

Multiple condition coverage reports whether every possible combination of Boolean sub-expressions occur. Condition/Decision coverage is a hybrid measure composed by the union of condition coverage and decision coverage. Path coverage reports whether each of the possible paths in each function have been followed. A path is a unique sequence of branches from the function entry to the exit.

Function coverage reports whether each function or procedure is invoked. Function coverage is useful during preliminary testing to assure at least some coverage in all areas of the software. Broad, shallow testing finds gross deficiencies in a test suite quickly.

Call coverage reports whether each function call is executed. The hypothesis is that faults commonly occur in interfaces between software modules. Call coverage is also known as call pair coverage.

Data flow coverage is a variation of path coverage that considers the sub-paths from variable assignments to subsequent references of the variables. The advantage of this measure is the paths have direct relevance to the way the program handles data. This measure generally does not include decision coverage.

Object code branch coverage reports whether each machine language conditional branch instruction both took the branch or fell through. This gives results that depend on the compiler rather than on the program structure since compiler code generation and optimization techniques can create object code that bears little similarity to the original source code structure.

Loop coverage reports how many times each loop body is executed consecutively. For "do-while" loops, loop coverage reports whether the body executed once or, if more than once, how many times.

Figure 3:
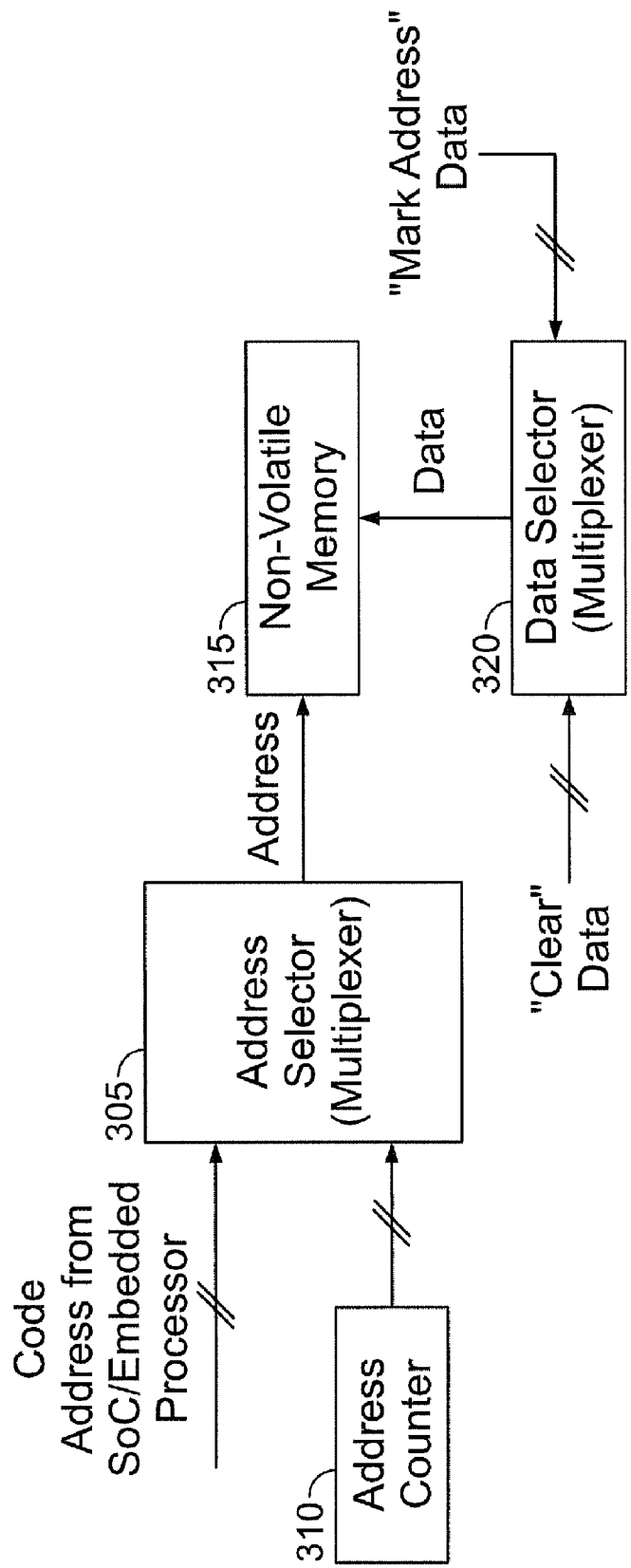
FIG. 3 is a block diagram describing an exemplary firmware code coverage address monitor in accordance with an embodiment of the present invention.

Referring now to FIG. 3, there is illustrated a block diagram describing an exemplary code coverage monitor 205. The code coverage monitor 205 comprises an address multiplexer (MUX) 305, an address counter 310, a non-volatile memory 315, and a data multiplexer (MUX) 320. The address MUX 305 selects either the code address from the SOC 105, or the address from the address counter 310. The data MUX 320 selects either a clear signal or an increment signal.

The non-volatile memory 315 is mapped to the addresses storing the instruction in the firmware in the code memory space 115 of the SOC 105. During operation, the non-volatile memory 315 receives an address from the address MUX 305, and data from the data MUX 320. Responsive thereto, the data received from the data MUX 320 is written to a memory location in the non-volatile memory 315 mapped to the address received from address MUX 305.

The code coverage monitor 205 can operate in one of two modes—a memory initialization mode and a monitoring mode. In the memory initialization mode, the code coverage monitor 205 clears the memory locations in the non-volatile memory 315. The address MUX 305 selects the address from address counter 310, while the data MUX 320 selects the clear data signal.

The address counter 310 is set to the first address in the non-volatile memory 315. When the address MUX 305 provides the address from the address counter 310 to the non-volatile memory 315 and the data MUX 320 provides the clear data signal, the memory location in the non-volatile memory 315 that is mapped to the address from the address counter 310 is cleared. Additionally, the address counter 310 increments to the next address. The foregoing is repeated until all of the locations in the non-volatile memory 315 are cleared.

In the monitoring mode, the address MUX 305 selects the code address received from the SOC, while the data MUX 320 selects an increment signal. When the address MUX 305 provides the address received from the SOC to the non-volatile memory 315 and the data MUX 320 provides the increment signal to the non-volatile memory 315, the contents stored in the memory location in the non-volatile memory 315 mapped to the address received from the SOC are incremented.

Figure 4:
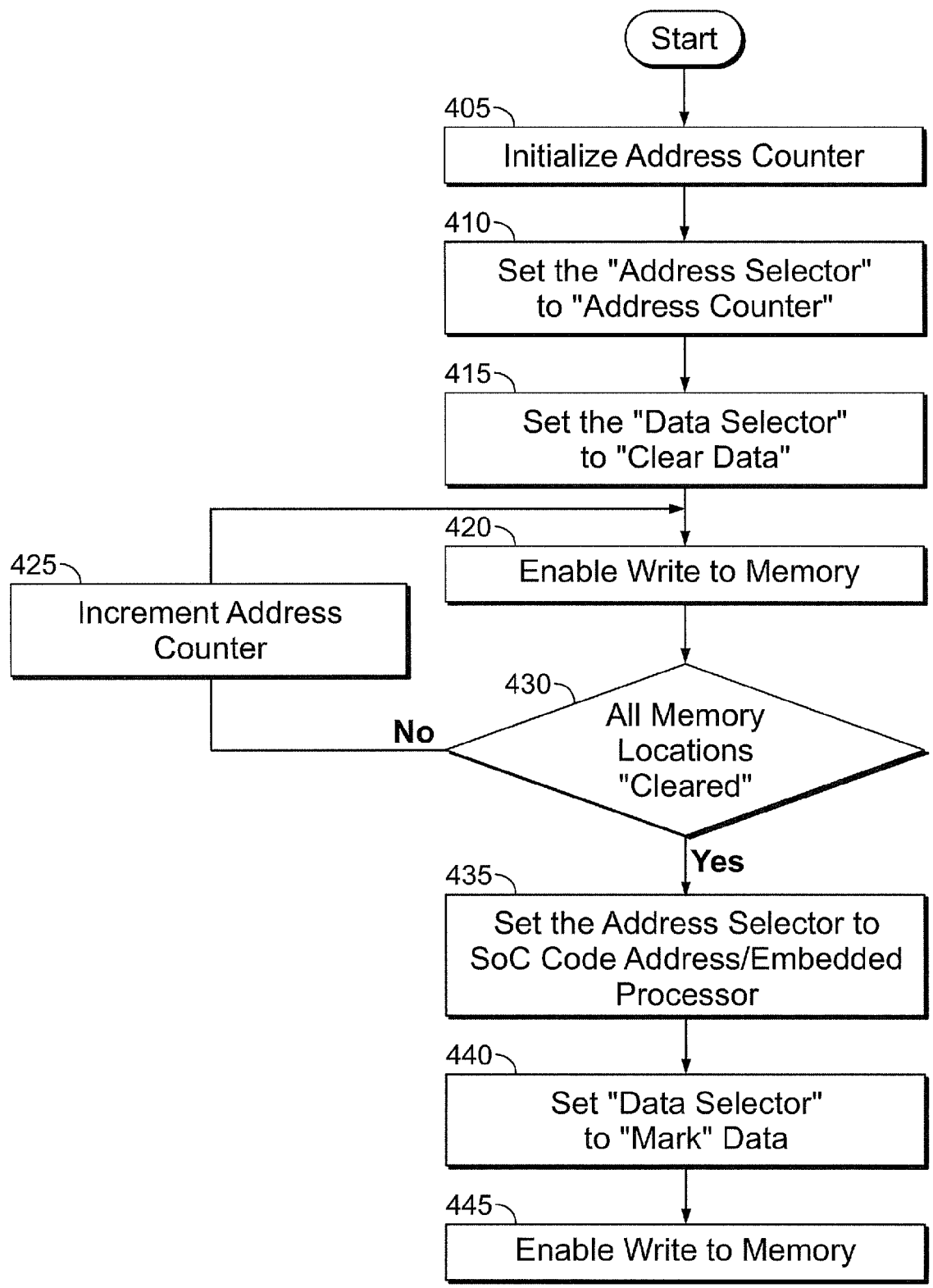
FIG. 4 is a flow diagram for analyzing code coverage in accordance with an embodiment of the present invention.

Referring now to FIG. 4, there is illustrated a flow diagram for analyzing code coverage in accordance with an embodiment of the present invention. At 405, the address counter 310 is set to the first address in the non-volatile memory 315. At 410, the address MUX 305 is set to select the address counter. At 415, the data MUX 320 is set to select the clear signal. When the address MUX 305 provides the address from the address counter 310 to the non-volatile memory 315 and the data MUX 320 provides the clear data signal, the memory location in the non-volatile memory 315 that is mapped to the address from the address counter 310 is cleared (420). Additionally, the address counter 310 increments (425) to the next address. The foregoing is repeated (430) until all of the locations in the non-volatile memory 315 are cleared.

The code coverage analyzer 305 then enters the monitoring mode. At 435, the address MUX 305 selects the code address received from the SOC, while the data MUX 320 selects (440) an increment signal. When the address MUX 305 provides the address received from the SOC to the non-volatile memory 315 and the data MUX 320 provides the increment signal to the non-volatile memory 315, the contents stored in the memory location in the non-volatile memory 315 mapped to the address received from the SOC are incremented (445).

The foregoing represents techniques for performing firmware code coverage analysis of firmware that is embedded in an SOC. Code coverage analysis is advantageously performed in a manner that does not require actual access to the program source code, does not require recompiling, and analyzes the code-coverage in real-time. Additionally, in the pre-fabrication case, verification of 100% code coverage can save chip data memory.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A circuit for analyzing code coverage of firmware by test inputs, said circuit comprising:
    an input for receiving an address from a code address bus;
    a memory for storing recorded addresses from the code address bus, the memory comprising a plurality of memory locations, each of the memory locations mapped to a particular one of a corresponding plurality of addresses associated with the firmware;
    an address multiplexer for making a first selection between the input and an address counter, and for providing the first selection to the memory; and
    the contents of the memory location associated with the address received from the code address bus being incremented responsive to receipt of the address.

2. The circuit of claim 1, further comprising:
    a data multiplexer for making a second selection between an increment signal and a clear signal, and for providing the second selection to the memory.

3. The circuit of claim 2, wherein if the data multiplexer selects the clear signal, and if the address multiplexer selects the address counter, then a memory location mapped to an address provided from the address counter is cleared.

4. The circuit of claim 1, wherein the contents of the memory location associated with the address received from the code address bus are incremented responsive to receipt of the address, thereby indicating a number of times the addressed has been received.

5. The circuit of claim 1, wherein the multiplexer further comprises:
    a first input that is directly connected to the input for receiving an address from a code address bus;
    a second input that is directly connected to the address counter; and
    an output that is directly connected to the memory.

6. The circuit of claim 5, wherein multiplexer directly connects the first input to the output if the input for receiving an address from a code address bus is the first selection and directly connects the second input to the output if the address counter is the first selection.

7. The circuit of claim 6, wherein the first selection is sometimes the input for receiving an address from a code address bus and is sometimes the address counter.

8. A method for analyzing code coverage, said method comprising:
    receiving an address from a code address bus, the address associated with an instruction in a system on chip;
    incrementing a memory location mapped to the address associated with the instruction;
    making a first selection between the input and an address counter; and
    providing the first selection to the memory.

9. The method of claim 8, further comprising:
    making a second selection between an increment signal and a clear signal; and
    providing the second selection to the memory.

10. The method of claim 9, wherein if the data the clear signal is selected, and the address counter is selected, then clearing a memory location mapped to an address provided from the address counter.

11. A circuit for analyzing code coverage of firmware by test inputs, said circuit comprising:
    an input for receiving an address from a code address bus;
    a memory operably connected to the input for storing recorded addresses from the code address bus, the memory comprising a plurality of memory locations, each of the memory locations mapped to a particular one of a corresponding plurality of addresses associated with the firmware;
    an address multiplexer connected to the input and an address counter, the address multiplexer making a first selection between the input and an address counter, and providing the first selection to the memory; and
    the contents of the memory location associated with the address received from the code address bus being incremented responsive to receipt of the address.

12. The circuit of claim 11, further comprising:
    a data multiplexer connected to the memory, the data multiplexer making a second selection between an increment signal and a clear signal, and providing the second selection to the memory.

13. The circuit of claim 12, wherein if the data multiplexer selects the clear signal, and if the address multiplexer selects the address counter, then a memory location mapped to an address provided from the address counter is cleared.

* * * * *

UNITED STATES PATENT AND TRADEMARK OFFICE
CERTIFICATE OF CORRECTION

PATENT NO. : 7,617,416 B2
APPLICATION NO. : 10/765615
DATED : November 10, 2009
INVENTOR(S) : Gupta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 878 days.

Signed and Sealed this

Nineteenth Day of October, 2010

David J. Kappos
*Director of the United States Patent and Trademark Office*